United States Patent [19]

Pagliuca

[11] Patent Number: 4,701,825

[45] Date of Patent: Oct. 20, 1987

[54] LINE PROTECTOR

[75] Inventor: Emanuel J. Pagliuca, Patchogue, N.Y.

[73] Assignee: TII Industries, Inc., Copiague, N.Y.

[21] Appl. No.: 848,801

[22] Filed: Apr. 7, 1986

[51] Int. Cl.[4] .............................................. H02H 9/06

[52] U.S. Cl. ..................................... 361/119; 361/124

[58] Field of Search ................................ 361/117-120, 361/124, 129, 130; 337/28, 29, 32-34; 179/91 R, 98

[56] References Cited

U.S. PATENT DOCUMENTS 4,056,840 11/1977 Lundsgaard et al. .......... 361/119 X 4,305,109 12/1981 Schilling et al. .................... 361/119

4,502,087 2/1985 Huvet ................................. 361/119

*Primary Examiner*—A. D. Pellinen

*Assistant Examiner*—Todd E. DeBoer

*Attorney, Agent, or Firm*—Sachs & Sachs

[57] ABSTRACT

A line protector device for providing an electrical conducting path between a line and ground upon an overvoltage appearing on the line includes an overvoltage device having a pair of longitudinally spaced conductive terminals forming an arc gap therebetween. One of the terminals includes a longitudinally extending portion and an insulation circumscribing the extending portion which is inserted into a longitudinally circumscribing shorting clip and is provided with a centrally disposed slit in one end which receives the extending portion of the overvoltage device. The clip and overvoltage device are received within a conductive cartridge which then may be inserted into a conventional terminal block.

4 Claims, 2 Drawing Figures

LINE PROTECTOR

BACKGROUND OF THE INVENTION

1. Field of the Invention

This invention relates to improvements in line protectors for communication circuits, such as telephone lines and the like, and more particularly, the present invention relates to protectors of the type intended for protection of wire conductors and equipment connected thereto from electrical overvoltage and overcurrent conditions.

2. Discussion of the Relevant Art

Many line protectors and overvoltage devices include what is known as "fail-safe" operation. By this it is meant that the protector should provide a direct metallic current path from the line to ground in the event of an overvoltage/overcurrent condition which would tend to damage the protector. Where a gas tube surge arrester is used in the protector, the provision of a fail-safe mode of operation, external to the gas tube is highly desirable.

Numerous approaches to providing an external fail-safe mechanism in a protector embodying a gas tube surge arrester is shown and described in U.S. Pat. No. 4,533,971 issued to T. J. Smith on Aug. 6, 1985 which is typical of devices presently in use today. This device utilizes a solder disc which melts upon overheating and provides a metallic contact between the line terminal and ground should the overvoltage exist for any length of time.

Other devices utilizing insulated materials which short or disintegrate so that a shorting clip makes contact is disclosed in U.S. Pat. No. 4,212,047 issued to J. Napiorkowski on July 8, 1980 and is considered typical of the devices which have an insulated material disintegrate with overheating. The present invention attempts to overcome shortcomings of the prior art by providing a device which includes a minimum of parts and is reliable.

It is an object of the present invention to provide a line protector of the general type and for the purpose stated that embodies a gas tube surge arrester for protecting the line against overvoltage faults.

It is another object of the present invention to provide a line protector which is relatively inexpensive to manufacture and contains a minimum of parts.

It is a further object of this invention to provide a line protector which embodies a mechanism for effecting a fail-safe operation in the event of an overvoltage/overcurrent line fault.

It is yet another object of the present invention to provide a line protector which provides a metallic conductor to ground as a result of a line fault.

SUMMARY OF THE INVENTION

A line protector device for providing an electrical conducting path between a line and ground upon an overvoltage appearing on the line, according to the principals of the present invention, comprises an overvoltage device having a pair of longitudinally spaced apart conductive terminals forming an arc gap therebetween. One of the terminals includes a longitudinally outwardly extending portion and insulation material circumferentially disposed about the extending portion. Also included is a shorting clip which longitudinally (axially) circumscribes the overvoltage device. The clip is divided with a centrally disposed slit in one end so that the extending portion of the overvoltage device may be placed therebetween resisting the inward bias of the shorting clip. The other end of the shorting clip is shaped to increase the inward bias when urged against a surface and is in electrically conductive contact with the other overvoltage device terminal. A hollow cartridge open on one end receives the shorting clip and the overvoltage protection device and is adapted to be threaded into an insulated terminal block, in a conventional manner.

The foregoing and other objects and advantages will appear from the description to follow. In the description reference is made to the accompanying drawing which forms a part thereof, and in which s shown by way of illustration a specific embodiment in which the invention may be practiced. This embodiment will be described in sufficient detail to enable those skilled in the art to practice the invention, and it is to be understood that other embodiments may be utilized and structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
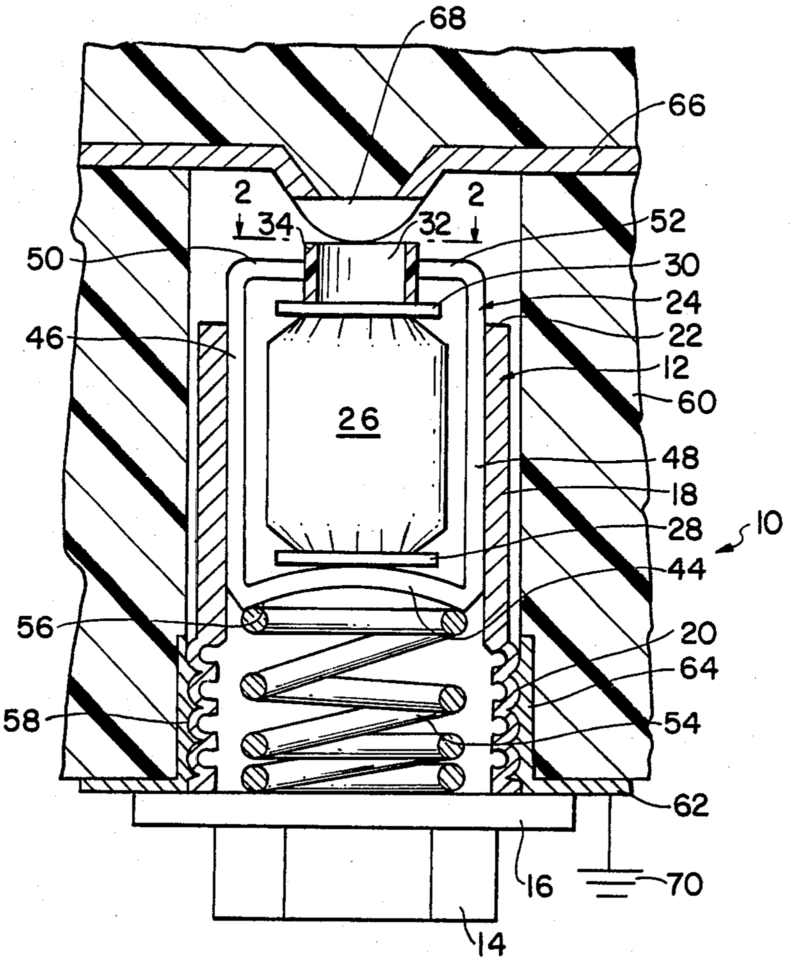
FIG. 1 is a partial cross-sectional view in elevation, of the line voltage protection device, according to the principles of the present invention.

Referring now to the drawings, and in particular, to FIG. 1, there is shown a line protector 10 that includes a hollow sheet metal cartridge tubular in shape having an insulated or conductive cap portion 14 that is provided with an annular radial flange 16 that is axially (longitudinally) spaced from the end wall of the cap portion 14. The cartridge 12 also includes a longitudinally extending tubular skirt portion 18 which is formed with an externally extending thread 20 adjacent to the flange 16. The cartridge 12 terminates in an open end 22.

Telescoped within and coaxial with the annular skirt 18 is a metallic electrically conductive shorting clip 24, which preferably is fabricated in one piece and circumscribes a conventional gas tube surge arrester or overvoltage device 26. The gas tube surge arrester device includes a pair of longitudinally spaced apart conductive terminals 28 and 30 forming an arc gap therebetween, not shown. Terminal 30 is provided with a longitudinally (axially) outwardly extending portion 32 preferably circularly-shaped over which is placed an insulating material 34 of approximately 0.004 to 0.005 inches in thickness of a well known and completely available polyethylene threphthalate resin sold under the trademark MYLAR.

Figure 2:
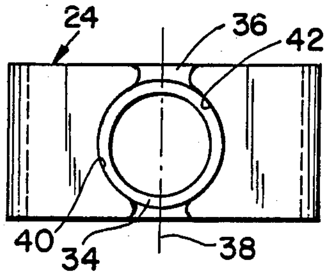
FIG. 2 is a top or plan view of the shorting clip disclosed in FIG. 1.

The shorting clip 24 is provided with a slit 36 on a centrally disposed transverse axis 38, shown in FIG. 2. The slit 36 may be provided with curved semicircularly-shaped openings 40 and 42 to readily engage the circularly-shaped portion 32, with the insulating material 34 disposed thereon, of the surge arrester 26. The other end of shorting clip 24 is provided with an arcuate or curved surface 44 in order to provide an inward bias to arms 46 and 48 of shorting clip 24. Shorting clip 24 is in electrical conductive contact with terminal 28 of the gas tube surge arrester 26 and will come into contact with terminal 30, via the outwardly extending portion 32 thereof should the insulating material 34 melt or be pierced by the fingers 50 and 52 of shorting clip 24.

Disposed between the curved end 44 of the shorting clip 24 and the cap 14 is a coil spring 54 which provides a surface 56 against which the curved surface 44 of shorting clip 24 may be urged, thus adding additional inward bias to the fingers 50 and 52 of shorting clip 24. Although a spring 54 is shown herein a solid member, not shown, may be utilized as long as a surface is provided to coact with the curved surface 44 of the shorting clip 24 is provided.

Cartridge 12 may be threaded into the well 58 fabricated of a dielectric (insulating) material. At the opening of the well 58 there is provided a metallic contact plate 62 having an internally threaded annular flange 64 for receiving the threads 20 of the cartridge 12. The dielectric material of the block 60 may also be threaded axially (longitudinally) beyond the flange 64 so that the cap may be threaded into the well 58 until the flange 16 abuts the contact plate 62. At the end of the well that is opposite to the contact plate 62 there is a contact strip 66 that is adapted to engage the extended portion 32 of terminal 30. The contact plate 62 and the contact strip 66 may be connected respectively, in a known manner to ground and to the line to be protected. In any event, when the protector cartridge 12 is threaded into the well 58 the engagement of the terminal 30 with the contact strip causes spring 54 to compress. If spring 54 were not to be utilized and a solid material or hollow cylinder were used in its place the threading of cartridge 12 into well 58 would be limited and electrical contact would still be made between the threads 20 and 64 on one end and terminal 30 and contact strip 66 on the other end. Contact strip 66 may also include a solder pellet placed at the apex of the contact strip so that contact with terminal 30 may more readily be made.

In operation, with the line connected to the contact strip 66, ground 70 connected to the contact plate 62, and the cartridge 12 inserted in well 58, there is no electrically conductive path to ground. Should an overvoltage occur causing breakdown of the gas tube surge arrester 26, the extra current flowing therein would cause terminal 30 to overheat melting the insulating material 34, thus causing fingers 50 and 52 to come into contact with terminal 30 providing an electrical conductive path to ground, via conductive strip 66, terminal 30, fingers 50 and 52 skirt 18, threads 20 and 64, through contact plate 62 to ground 70. Thus, an overvoltage provides safety to the line by insuring that a short to ground occurs and thus protects any equipment connected to the line being protected. By removing the cartridge 12 from well 58 the gas tube surge arrester 26 may be removed, the insulating material 34 replaced, and the surge arrester 26 may be reinserted into the shorting clip 24 which is returned into the skirt 18 of cartridge 12 for reuse. By replacing cartridge 12 back into well 58 the line is once more protected, a short (conductive path to ground) is removed and the line becomes usable again.

Hereinbefore has been disclosed a reliable, inexpensive line protector which may readily replace existing cartridges in use today.

It will be understood that various changes in the details, materials, arrangement of parts and operating conditions which have been herein described and illustrated in order to explain the nature of the invention may be made by those skilled in the art within the principals and scope of the instant invention.

Having thus set forth the nature of the invention, what is claimed is:

1. A line protector device for providing an electrical conducting path between a line and ground upon an overvoltage appearing on said line, comprising:

(a) an overvoltage device having a pair of longitudinally spaced apart conductive electrodes forming an arc gap therebetween, one of said electrodes including;
   (i) a longitudinally outwardly extending portion, and
   (ii) insulation means circumferentially disposed about said extending portion;
(b) shorting clip means longitudinally circumscribing said overvoltage device being provided with a centrally disposed slit on one end, said extending portion with said insulation means disposed upon said extending portion being positioned within said slit, said insulation means resisting the inward bias of said shorting clip means, said insulation means permitting electrical conduction between said extending portion and said shorting clip upon overheating, the other end of said shorting clip means being shaped to increase said inward bias when urged against a surface and being in electrically conductive contact with the other overvoltage device terminal; and
(c) hollow cartridge means being electrically conductive, said cartridge means being provided with an opening on one end adapted to receive said overvoltage device and said shorting clip means, and being in electrically conductive contact with said shorting clip means, the other end of said cartridge being externally threaded and including a cap portion.

2. A line protector device according to claim 1 further including spring means coaxially disposed between said shorting clip other end and said cartridge means cap portion.

3. A line protector device according to claim 1 wherein said shorting clip means is generally rectangularly-shaped when viewed in elevation, said slit one end having shaped openings adapted to receive said insulation means disposed on said extending portion, said shorting clip means other end being curved so as to increase the inward bias of said shaped openings of said first end when said shorting clip means other end is urged against a surface.

4. A line protector device according to claim 1 wherein said overvoltage device outwardly extending portion is integral with one of said conductive electrodes.

* * * * *